United States Patent
Chen

(10) Patent No.: US 7,912,044 B2
(45) Date of Patent: Mar. 22, 2011

(54) EXPANDABLE STRUCTURE FOR PERIPHERAL STORAGE DEVICE

(75) Inventor: Patrick Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 533 days.

(21) Appl. No.: 11/461,186

(22) Filed: Jul. 31, 2006

(65) Prior Publication Data

US 2007/0047537 A1    Mar. 1, 2007

(30) Foreign Application Priority Data

Aug. 29, 2005    (TW) ................. 94129548 A

(51) Int. Cl.
*H04L 12/66*    (2006.01)
*H04J 3/16*    (2006.01)
(52) U.S. Cl. .................. 370/366; 370/465
(58) Field of Classification Search ............ 370/366
See application file for complete search history.

(56) References Cited

U.S. PATENT DOCUMENTS

| 7,159,055 B2* | 1/2007 | Chiang et al. ........... 710/74 |
| 7,225,290 B2* | 5/2007 | Barth et al. ........... 710/316 |
| 2003/0135681 A1 | 7/2003 | Laity et al. |
| 2004/0222826 A1 | 11/2004 | Takeuchi et al. |

OTHER PUBLICATIONS

Serial ATA International Organization, Serial ATA II: Port Multiplier, Dec. 21, 2004, www.sata-io.org.

* cited by examiner

*Primary Examiner* — Melanie Jagannathan
(74) *Attorney, Agent, or Firm* — Kirton & McConkie; Evan R. Witt

(57) ABSTRACT

The present invention relates to an expandable structure for peripheral storage devices. The expandable structure includes an interface controller having a plurality of connecting ports for serial data transmission; and a Port Multiplier electrically connected to one of the connecting ports of the interface controller for serial data transmission, and the Port Multiplier having a plurality of expanded connecting ports, wherein each of the expanded connecting ports is capable of connecting to a peripheral storage device with a parallel data transmission mode or a peripheral storage device with a serial data transmission mode.

12 Claims, 2 Drawing Sheets

EXPANDABLE STRUCTURE FOR PERIPHERAL STORAGE DEVICE

FIELD OF THE INVENTION

The present invention relates to an expandable structure for peripheral storage devices, and more particularly to a Port Multiplier in communication with IDE (Integrated Drive Electronics) peripheral storage devices with a parallel data transmission mode and SATA (Serial Advanced Technology Attachment) peripheral storage devices with a serial data transmission mode.

BACKGROUND OF THE INVENTION

Conventionally, IDE specification with a parallel data transmission mode is usually applied to an interface controller between a hard disc drive and a host computer. However, with the progress of data transmission technology, IDE specification has been gradually replaced by SATA specification having a higher data transmission speed. Therefore, conventional IDE peripheral storage devices with a parallel data transmission mode must be collocated with an extra SATA-to-IDE bridge for functions under SATA specification.

FIG. 1 depicts an expanded structure 10 for peripheral storage devices in prior art, and the expanded structure 10 comprises: a host computer 11; an interface controller 12 having a plurality of connecting ports 121~124 for serial data transmission, and electrically connected to the host computer 11; a SATA-to-IDE bridge 13; a peripheral storage device P1 with a parallel data transmission mode electrically connected to bridge 13; a Port Multiplier 14 in communication with interface controller 12, having a plurality of expanded connecting ports 1401~1414; and a plurality of peripheral storage devices S01~S14 with a serial data transmission mode electrically connected to expanded connecting ports 1401~1414, respectively.

Conventionally, Port Multiplier 14 is only compatible of peripheral storage devices S01~S14 with a serial data transmission mode, therefore, for processing data transmission with a peripheral storage device P1 having a parallel data transmission mode, a SATA-to-IDE bridge 13 is necessarily coupled between the interface controller 12 and the peripheral storage device P1 with a parallel data transmission mode. An extra device usually means an extra production cost. Being compatible of peripheral storage devices with a parallel data transmission mode without any extra device needed is the main purpose of this present invention.

SUMMARY OF THE INVENTION

The present invention provides an expandable structure for peripheral storage devices, and a Port Multiplier in communication with an IDE peripheral storage device with a parallel data transmission mode and a SATA peripheral storage device with a serial data transmission mode.

One aspect of this present invention is an expandable structure for peripheral storage devices, comprising: an interface controller having a plurality of connecting ports for serial data transmission; and a Port Multiplier electrically connected to one of the connecting ports of the interface controller for serial data transmission, and the Port Multiplier having a plurality of expanded connecting ports, wherein each of the expanded connecting ports is capable of connecting to a peripheral storage device with a parallel data transmission mode or a peripheral storage device with a serial data transmission mode.

Another aspect of this present invention is a Port Multiplier, in communication between an interface controller and a peripheral storage device, having a plurality of expanded connecting ports and each of the expanded connecting ports comprising: a data-transmission-mode-process circuit for detecting a data transmission mode of the peripheral storage device, and converting parallel data to serial data and outputting the converted serial data to the interface controller if the peripheral storage device is with a parallel data transmission mode, or directly outputting serial data to the interface controller if the peripheral storage data is with a serial transmission mode.

DETAILED DESCRIPTION OF THE PREFERRED EMBODIMENT

Figure 2:
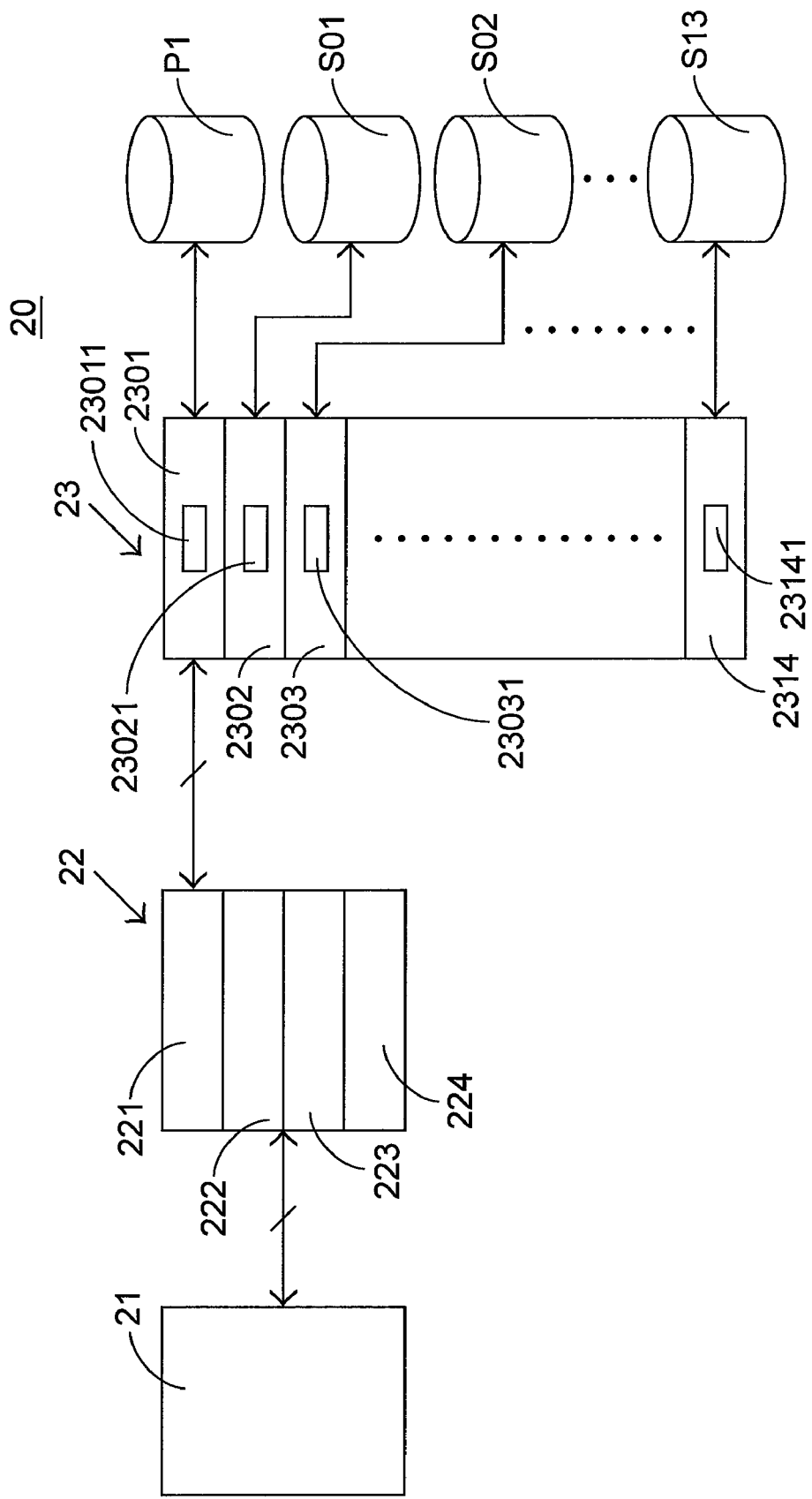
FIG. 2 is a functional diagram schematically illustrating an expandable structure with data-transmission-mode-process circuits for peripheral storage devices in an embodiment of this present invention.

FIG. 2 depicts a functional diagram schematically illustrating an expandable structure with data-transmission-mode-process circuits for peripheral storage devices in an embodiment of this present invention. The expandable structure 20 comprises: a host computer 21; an interface controller 22 having a plurality of connecting ports 221~224 for serial data transmission and electrically connected to host computer 21; a Port Multiplier 23 in communication with interface controller 22 having a plurality of expanded connecting ports 2301~2314 with data-transmission-mode-process circuits 23011~23141, respectively; a peripheral storage device P1 with a parallel data transmission mode electrically connected to the expanded connecting port 2301 of the Port Multiplier 23; and a plurality of peripheral storage devices S01~S13 with a serial data transmission mode electrically connected to the expanded connecting ports 2302~2314 of the Port Multiplier 23, respectively.

Figure 1:
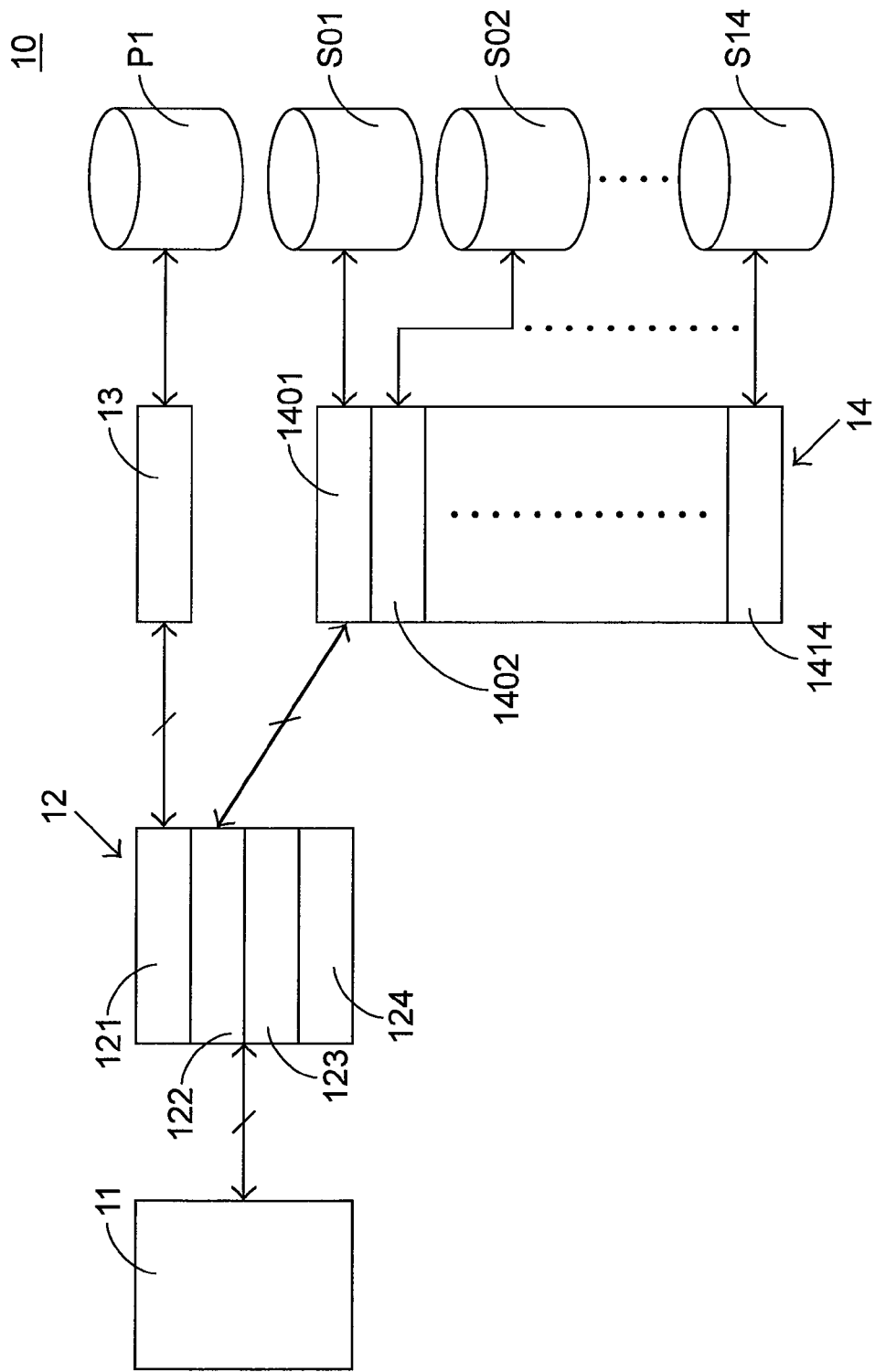
FIG. 1 is a functional diagram schematically illustrating an expanded structure having a SATA-to-IDE bridge 13 for data transmission with peripheral storage devices in prior art.

In an embodiment as depicted in FIG. 2, because a plurality of data-transmission-mode-process circuits 23011~23141, for detecting respective data transmission modes of peripheral storage device P1 and S01~S13 and, are integrated with respective expanded connecting ports 2301~2314, peripheral storage device P1 with a parallel data transmission mode and peripheral storage devices S01~S13 with a serial data transmission mode can be both electrically connected to the Port Multiplier 23 without via a SATA-to-IDE bridge 13 (FIG. 1). For example, when peripheral storage device P1 with a parallel data transmission mode is in communication with the expanded connecting port 2301, data-transmission-mode-process circuit 23011 within the expanded connecting port 2301 will automatically detect the data transmission mode of the connected device P1, convert the receiving parallel data to serial data, and output the converted serial data to the interface controller 22. Alternatively, when the peripheral storage devices S01-S13 with a serial data transmission mode are in communication with respective expanded connecting ports 2302~2314, data-transmission-mode-process circuits 23021~23141 within respective expanded connecting ports 2302~2314 will automatically detect the data transmission modes of connected devices S01~S13 and directly output the serial data to the interface controller 22.

Data-transmission-mode-process circuits 23021~23141, for detecting data transmission modes of connected devices, can be implemented by a well-known conventional technology via detecting voltage signals of pins of the connected devices. Detail description of data-transmission-mode-process circuit will be omitted.

In addition, another embodiment of the present invention can be implemented by limiting a portion of the expanded connecting ports for peripheral storage devices with a parallel data transmission mode only and the other expanded connecting ports are for peripheral storage devices with a serial data transmission mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An expandable structure for peripheral storage devices, comprising:
   an interface controller having a plurality of connecting ports for serial data transmission; and
   a Port Multiplier electrically connected to one of the connecting ports of the interface controller for serial data transmission, and the Port Multiplier having a plurality of expanded connecting ports, wherein each of the expanded connecting ports is in direct connection between one peripheral storage device and the connecting port of the interface controller, wherein the peripheral storage device is arbitrarily a parallel data transmission mode or a serial data transmission mode, and the connecting port of the interface controller conforms to essentially the serial data transmission mode, and each of the expanded connecting ports comprises a data-transmission-mode-process circuit for automatically detecting a data transmission mode of the peripheral storage device connected to the expanded connecting port to determine whether the connected peripheral storage device is with the parallel data transmission mode or the serial transmission mode, and converting parallel data to serial data and outputting the converted serial data to the interface controller if the connected peripheral storage device is with the parallel data transmission mode.

2. The expandable structure for peripheral storage devices of claim 1, further comprising a host computer electrically connected to interface controller for serial data transmission.

3. The expandable structure for peripheral storage devices of claim 1, wherein the interface controller is a SATA interface controller with the serial data transmission mode.

4. The expandable structure for peripheral storage devices of claim 1, wherein each of the data-transmission-mode-process circuits directly outputs serial data to the interface controller if the connected peripheral storage device is with a serial data transmission mode.

5. The expandable structure for peripheral storage device of claim 1, wherein the peripheral storage device with the parallel data transmission mode is an IDE peripheral storage device.

6. The expandable structure for peripheral storage device of claim 1, wherein the peripheral storage device with a serial data transmission mode is a SATA peripheral storage device.

7. The expandable structure for peripheral storage devices of claim 1, wherein the data-transmission-mode-process circuit automatically detects the data transmission mode of the peripheral storage device connected thereto by detecting voltage signals of pins of the peripheral storage device connected thereto.

8. A Port Multiplier, in communication between an interface controller and at least one peripheral storage device, and having a plurality of expanded connecting ports, wherein each of the expanded connecting ports is in direct connection between one peripheral storage device and one connecting port of the interface controller, wherein the peripheral storage device is arbitrarily a parallel data transmission mode or a serial data transmission mode, and each of the expanded connecting ports comprises:
   a data-transmission-mode-process circuit for automatically detecting a data transmission mode of the peripheral storage device directly connected to the expanded connecting port to determine whether the connected peripheral storage device is with the parallel data transmission mode or the serial data transmission mode, converting parallel data to serial data and outputting the converted serial data to the interface controller if the peripheral storage device is with the parallel data transmission mode, and directly outputting serial data received from the peripheral storage device to the interface controller if the peripheral storage data is with the serial transmission mode.

9. The Port Multiplier of claim 8, wherein the interface controller is a SATA interface controller with the serial data transmission mode.

10. The Port Multiplier of claim 8, wherein the peripheral storage device with the parallel data transmission mode is an IDE peripheral storage device.

11. The Port Multiplier of claim 8, wherein the peripheral storage device with the serial data transmission mode is a SATA peripheral storage device.

12. The Port Multiplier of claim 8, wherein the data-transmission-mode-process circuit automatically detects the data transmission mode of the peripheral storage device connected thereto by detecting voltage signals of pins of the peripheral storage device connected thereto.

* * * * *